US006963217B2

(12) United States Patent
Samudrala et al.

(10) Patent No.: US 6,963,217 B2
(45) Date of Patent: Nov. 8, 2005

(54) METHOD AND APPARATUS FOR CREATING CIRCUIT REDUNDANCY IN PROGRAMMABLE LOGIC DEVICES

(75) Inventors: Praveen K. Samudrala, Tampa, FL (US); Srinivas Katkoori, Tampa, FL (US); Jeremy Ramos, Tampa, FL (US)

(73) Assignees: University of South Florida, Tampa, FL (US); Honeywell Space Systems, Inc., Clearwater, FL (US)

( * ) Notice: Subject to any disclaimer, the term of this patent is extended or adjusted under 35 U.S.C. 154(b) by 0 days.

(21) Appl. No.: 10/708,268

(22) Filed: Feb. 20, 2004

(65) Prior Publication Data

US 2004/0230935 A1 Nov. 18, 2004

Related U.S. Application Data (60) Provisional application No. 60/319,963, filed on Feb. 21, 2003.

(51) Int. Cl.[7] .................. H03K 19/003; H03K 19/173; H03K 19/177; G06F 7/38
(52) U.S. Cl. ........................................ 326/11; 326/38
(58) Field of Search .............................. 326/10, 11, 38, 326/39, 40, 41

(56) References Cited

U.S. PATENT DOCUMENTS

| 4,964,126 A | 10/1990 | Musicus et al. |
| 6,298,289 B1 | 10/2001 | Lloyd et al. |

OTHER PUBLICATIONS

Carmichael et al., "SEU Mitigation Techniques for Virtex FPGAs in Space Applications", 1999 MAPLD Conference, pp. 1–21.*

Brindley et al. "SEU Mitigation Design Techniques for the XQR4000XL", Xilinx, XAPP181 (v1.0) Mar. 15, 2000.*

Carmichael, "Tripie Module Redundancy Design Techniques for Vitrex FPGAs", Xilinx, XAPP197 (v1.0) Nov. 1, 2001.*

(Continued)

*Primary Examiner*—Daniel Chang
(74) *Attorney, Agent, or Firm*—Smith & Hopen, P.A.; Molly L. Sauter

(57) ABSTRACT

A method for reducing circuit sensitivity to single event upsets in programmable logic devices, involves identifying single event upset sensitive gates within a single event upset sensitive sub-circuit of a programmable logic device as determined by the input environment and introducing triple modular redundancy and voter circuits for each single event upset sensitive sub-circuit so identified.

26 Claims, 8 Drawing Sheets

6A

6B

6C

6D

OTHER PUBLICATIONS

Samudrala, Praveen Kumer et al., Selective Triple modular Redundancy for SEU Mitigation in FPGAs, pp. 1–3, no date.

Samudrala, Praveen K. et al., Selective Triple Modular Redudcancy (STMR) Based Single Event Upset (SEU) Tolerant Synthesis for FPGAs. pp. 1–26, Oct. 2004.

Samudrala, Praveen K. et al., A Novel Technique for SEU Mitigation in Combinational Circuits Mapped to FPGA's, pp. 1–31, no month 2001.

Carmichael, Carl, Triple Module Redundancy Design Techniques for Virtex FPGAs, XILINX, Nov. 1, 2001, pp. 1–37, XAPP197 (v1.0).

Label, Kenneth A. et al., Single–Event–Effect Mitigation from a System Perspective, IEEE Transactions on Nuclear Science, Apr. 1996, 46–2, pp. 654–660.

Eduardo Augusto Bezerra et al., Improving Reconfigurable Systems Reliability by Combining Periodical Test and Reduncancy Techniques: A Case Study, pp. 1–10, no date.

Zoltan Meggyesi et al., FPGA Design in the Presence of Single Event Upsets, CERN, Geneva, Switerland. pp. 1–4, no date.

Single Event Upset (SEU) Mitigation by Virtual Triple Modular Redundancy (TMR) in Design Reduces Manufacturing Cost and Lowers Power, Alternative System Concepts, Inc., p. 1–7, no date.

Earl Fuller et al., Radiation Testing Update, SEU Mitigation, and Availability Analysis of the Virtex FPGA for Space Reconfigurable Computing, p. 1–11, Sep. 2000.

K. Nikolic et al., Fault–Tolerant Techniques for Nanocomputers, TNT2001, Sep. 3–7, 2001, Segovia, Spain, pp. 1–3.

Carl Carmicheal et al., SEU MitigationTechniques for Virtex FPGAs in Space Application, pp. 1–11, 1999, no month.

Praveen Samudrala et al., Single Event Upsets and Mitigation Technigues: A Survey, pp. 1–15, no date.

Srinivas Katkoori, SEU Tolerant Design Techniques for Space Based RC Implementations, IR & D Project, Mar. 28, 2001, pp. 1–2.

Praveen K. Samudrala, Synthesis of SEU Tolerant FPGAs, Jan. 22, 2003, pp. 1–53.

Samudrala, Praveen K. et al., A Novel Technique for SEU Mitigation in Combinational Circuits Mapped to FPGA's, pp. 1–31.

Carl Carmicheal et al., SEU Mitigation Techniques for Virtex FPGAs in Space Application, pp. 1–11, 1999.

* cited by examiner

| Gate Type | $P_{out}$ |
|-----------|-----------|
| AND | $\Pi_i P_i$ |
| NAND | $1 - \Pi_i P_i$ |
| OR | $\Sigma_i P_i - \Pi_i P_i$ |
| NOR | $1 - (\Sigma_i P_i - \Pi_i P_i)$ |
| XOR | $\Sigma_{i,j} P(i)(1-P(j))$ |
| XNOR | $1 - (\Sigma_{i,j} P(i)(1-P(j)))$ |

Fig. 3

SEU-sensitive gate

Fig. 4

SEU-insensitive gate

METHOD AND APPARATUS FOR CREATING CIRCUIT REDUNDANCY IN PROGRAMMABLE LOGIC DEVICES

CROSS-REFERENCE TO RELATED APPLICATION

This application claims priority to U.S. Provisional Patent Application No. 60/319,963, entitled: "Redundancy Method for Space Electronics", filed Feb. 21, 2003.

BACKGROUND OF INVENTION

Field Programmable Gate Arrays (FPGAs) are popular for space application because of their low cost, reconfigurability, and low design turn around time. Triple modular redundancy (TMR) is a widely used design-hardening technique for obtaining high immunity against single event upsets (SEUs). As the name suggests, the circuit is triplicated and the final output is generated by taking the majority vote of those generated by the triplicates. The main disadvantage of TMR techniques known in the art is the excessive area overhead. While TMR is the most robust mitigation technique, the implementation of TMR greatly increases the overhead of the device and subsequently the area required for the circuitry. The hardened design can have up to 200% more area than the original circuit. In the context of space-based applications, this implies an increase of the payload by 200%.

Single event upsets are a major cause of concern for SRAM based FPGAs. Although SEUs show up as soft errors in combinational circuits, they transform into more serious permanent faults when they are mapped to FPGAs. The situation occurs because the same combinational circuits are mapped on the FPGA using Look Up Tables (LUTs), which consist of SRAM cells. As such, an SEU in these cells could be latched, thus transforming the transient fault into a permanent fault. Additionally, the interconnection of the FPGA is also controlled using the data stored in SRAM cells. Since the information defining the functionality of an FPGA is also stored in memory cells, an upset in them could lead to malfunctioning of the device and prove fatal to the mission. As such, it is critical that the SEUs be carefully addressed for a mission employing SRAM based FPGAs.

Design hardening is one of the techniques employed to mitigate SEUs. Hardening by design includes introducing hardware and/or software redundancy. Electronic devices intended for space applications can be designed from a library of SEU tolerant basic gates and memory cells. Such structures of gates and SRAM cells are known in the art. A SEU hardened version of a Boolean gate is obtained by modifying its basic structure by adding a few additional transistors. However, these SEU tolerant SRAM cells cannot be applied to programmable devices because the programmable devices are commercially off the shelf devices that are prefabricated. As such, the entire design cycle would need to be modified and it cost-prohibitive.

Figure 1:
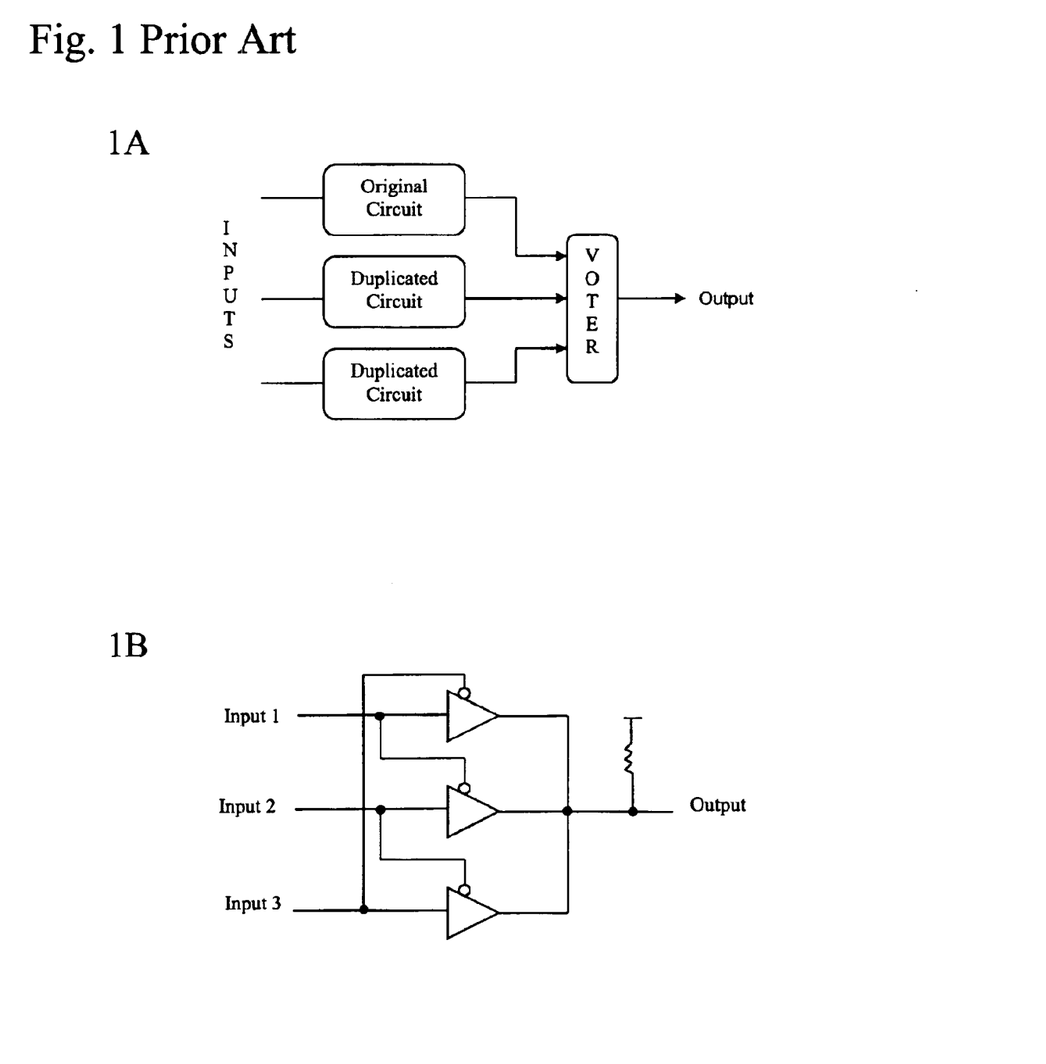
FIG. 1A and 1B is a diagrammatic view of a triple modular redundancy technique known in the prior art.

An alternative to using SEU hardened library of cells is to apply modular redundancy. Triple Modular Redundancy (TMR) is one such technique known in the art where a module is replicated three times and the output extracted from a majority voter as shown in FIG. 1, in which FIG. 1A illustrates the prior art TMR technique in block diagram form and FIG. 1B illustrates the prior art TMR technique at the gate level.

A TMR system can withstand only single upsets at any instant of time, thus, if two redundant modules are simultaneously upset, then the output cannot be guaranteed to be correct. Also, if two modules are permanently damaged, the whole TMR system has to be discarded. The redundant system is considered SEU tolerant under the assumption that the voter circuit is completely immune to SEUs.

The correct implementation of TMR depends on the type of module to be hardened. For example, the method of implementing TMR for sequential circuits differs from that of combinational circuits.

Field programmable gate arrays commonly known in the art include triple modular redundancy for SEU-hardening. While TMR is the most robust mitigation technique, the main drawback of using TMR for SRAM based FPGAs is that the voter circuit has to be implemented using SRAM cells which themselves are highly susceptible to upsets. Consequently, FPGAs are known in the art to include tri-state buffers, which can be used to effectively build an SEU tolerant voter circuit.

There remains a need in the art for a design-hardening technique with reduced overhead and area requirements over the circuit redundancy techniques known in the art.

However, in view of the prior art considered as a whole at the time the present invention was made, it was not obvious to those of ordinary skill in the pertinent art how the identified need could be fulfilled.

SUMMARY OF INVENTION

The present invention provides a gate-level synthesis technique known as selective TMR (STMR) that hardens a design against SEUs by selectively inserting TMR in the sensitive gates as determined by the input environment. The STMR method of the present invention extends the basic TMR technique by identifying SEU "sensitive" gates in a given circuit and then introduces TMR selectively at these gates. The sensitivity of a gate to an SEU is determined by the signal probabilities at the primary inputs of the circuit. Given a gate-level implementation and the input signal probabilities, the input signals probabilities are propagated to compute the signal probability of each internal node. A gate is considered sensitive if an SEU on any one of the inputs is likely to be propagated to the output of the gate. The advantage of this technique is that the area overhead is smaller that of the full TMR. Using the STMR method in accordance with the present invention, the user can tradeoff circuit area with the hardness level. STMR combined with readback and reconfiguration of the device will result in an improved SEU immunity.

In one embodiment of the present invention a method is provided for creating circuit redundancy in programmable logic devices. The method includes identifying at least one single event upset sensitive sub-circuit of a programmable logic device and introducing circuit redundancy for each single event upset sensitive sub-circuit identified.

Identifying a single event upset sensitive sub-circuit includes identifying a single event upset sensitive gate within a sub-circuit. A single event upset sensitive gate is identified by selecting a gate having a plurality of inputs, selecting a threshold probability, associating an input probability with each of the plurality of inputs, assigning a logic value to each of the plurality of inputs, wherein a dominant logic value is assigned to the input if the input probability is greater than the threshold probability and a non-dominant logic value is assigned to the input if the input probability is less than the threshold probability, and thereby determining the sensitivity of the gate.

Determining the sensitivity of the gate includes, identifying the gate as a sensitive gate if only one of the inputs to the gate is assigned a dominant logic value, identifying the gate as a sensitive gate if all of the inputs to the gate are assigned non-dominant logic values. Additionally, a gate is identified as a sensitive gate if the gate is an EXOR, EXNOR or NOT gate.

In assigning a logic value to the inputs of the gates, a logic value of zero is assigned to an input if the input probability is less than the threshold probability and a logic value of one is assigned to an input if the input probability is greater than the threshold probability.

In accordance with an embodiment of the present invention, triple modular redundancy is introduced for each single event upset sensitive gate of a single event upset sensitive sub-circuit that is identified as sensitive.

In an additional embodiment, the method in accordance with the present invention is implemented for a FPGA having a plurality of interconnected gates, wherein the gates have a plurality of inputs and a plurality of outputs. Accordingly, the method includes identifying a plurality of primary inputs, identifying a plurality of primary outputs, selecting a threshold probability, associating an input probability with each of the plurality of primary inputs, calculating an input probability for each of the plurality of inputs of the plurality of interconnected gates by propagating the input probability of each of the plurality of primary inputs to the corresponding plurality of primary outputs, assigning a logic value to each of the plurality of inputs and the plurality of primary inputs, wherein a dominant logic value is assigned to the input if the input probability is greater than the threshold probability and a non-dominant logic value is assigned to the input if the input probability is less than the threshold probability, identifying a single event upset sensitive sub-circuit by beginning at a primary output and backtracking recursively through the corresponding interconnected gates.

Upon identification of the single event upset sensitive sub-circuit, triple modular redundancy is then introduced for each gate of the identified single event upset sensitive sub-circuit. Additionally, a voter can be introduced between each triplicated gate and the input to a nontriplicated gate. The voter may be a look-up table or a tri-state buffer.

In accordance with the present invention, the probability threshold can be selected to satisfy a required single event upset immunity. Additionally, the probability threshold can be selected to satisfy a required area constraint of the programmable logic device. Additionally, software profiling can be used to identifying the primary input probabilities further comprises software profiling.

In an embodiment of the present invention, a programmable logic device (PLD) is configured to implement a circuit having reduced sensitivity to single event upsets. The circuit in accordance with the present invention includes a plurality of sub-circuits, the PLD including, a redundant circuit for each single event upset sensitive gate comprising each single event upset sensitive sub-circuit.

The method of the present invention provides benefits over the triple modular redundancy techniques know in the art. These benefits include, reduced area requirements for the TMR circuit and reduced payload of the device.

BRIEF DESCRIPTION OF DRAWINGS

For a fuller understanding of the invention, reference should be made to the following detailed description, taken in connection with the accompanying drawings, in which:

FIG. 1A illustrates the prior art TMR technique in block diagram form. FIG. 1B illustrates the prior art TMR technique at the gate level.

FIG. 6A–6D are is an diagrammatic views illustrating exemplary connections between two triplicated modules without fanout and connections between two triplicated modules with fanout.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In accordance with the present invention, primary input probabilities are propagated to primary outputs in one pass. In the next pass, SEU-sensitive gates are determined by beginning at the primary outputs and backtracking in order through the circuit. A sub-circuit that is identified to consist of SEU-sensitive gates is identified to be SEU-sensitive. Triple modular redundancy is introduced for each SEU-sensitive sub-circuit.

To determine the input probabilities, the input environment is characterized. In characterizing the input environment, typically the user of an application will have an idea of the environment in which the device will be employed. In the case of space-based applications as in for weather forecasting satellites, the input environment can be characterized based on the image data that is captured.

Profiling is a known method for input characterization. Software profiling techniques are widely used in software development to identify the often-executed portions of the code. Representative benchmarks are used to gather profile data. In the past decade, profiling for hardware design has been extensively used to design low power systems. The profiled data can be summarized either in the form of input signal probabilities or in terms of "representative" input sequence. In the case of representative input sequence, vector-compaction based schemes have been proposed to reduce the length of such sequences. The representative sequence can be reduced to input probabilities by simulating the circuit with the sequence. Thus, it is justified to assume that the input environment information is available in the form on input signal probabilities. In the context of SEU-hardening synthesis methods, the probabilities are based on the radiation environment the device will be subjected to and the nature of the circuit.

The concept of a "sensitive" input of a gate is identified by the Critical Path Tracing (CPT) algorithm. With respect to a test vectors, a gate input is sensitive (in a test t) if complementing its value changes the value of the gate output. The sensitive inputs of a gate with two or more inputs is determined as follows:
1. If only one input j has the dominant value of the gate, then j is sensitive.
2. If all inputs have non-dominant values, then all inputs are sensitive.

Since, the present invention utilizes signal probabilities rather than test vectors, it order to apply the above definition, a threshold probability must be defined. As such, the logic value assumed by a line is "0" if its signal probability is less than the threshold probability, $P_{threshold}$, otherwise it assumes a logic "1". Additionally, if a gate has one or more sensitive inputs, then the gate is considered to be sensitive to SEUs. As such, given a $P_{threshold}$, logic values as assigned as described above for the inputs of the gate, the gate's sensitivity is determined by application of the CPT definition and the identification of a sensitive gate.

Figure 2:
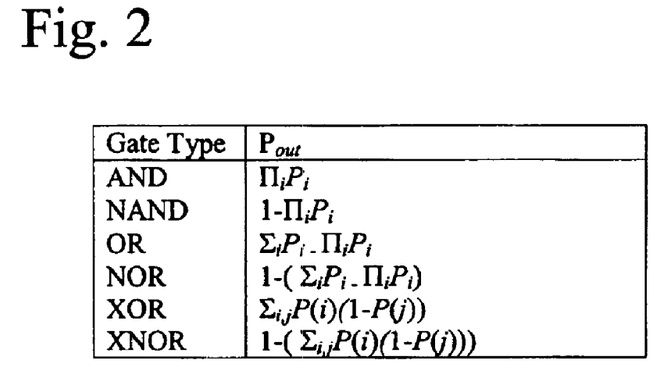
FIG. 2 is a table illustrative of the signal probability computation at the output of a Boolean gate.

The signal probability of the output ($P_{out}$) of an n-input gate with i-th input having $P_i$ signal probability is determined by the type of gate as shown in the table of FIG. 2.

Figure 3:
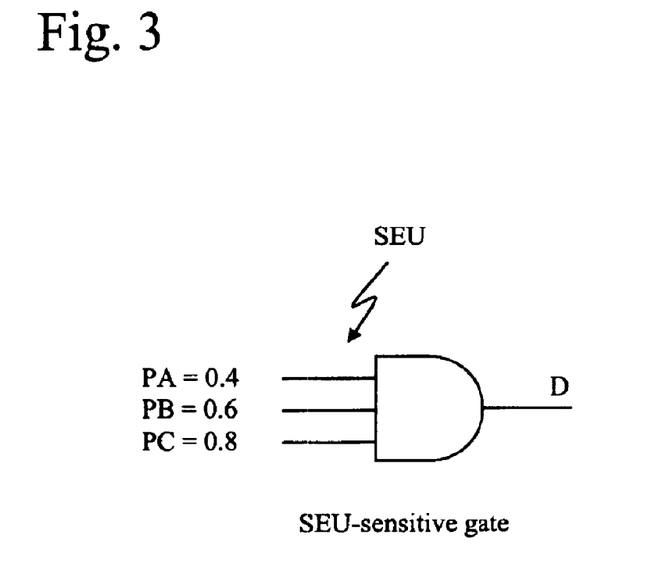
FIG. 3 is a diagrammatic view illustrating a single event upset (SEU) sensitive gate at a $P_{threshold}$ of 0.5 in accordance with the present invention.

With reference to FIG. 3, an example illustrating the method employed to find the sensitivity of a gate is shown. Consider a 3-input AND gate with the signal probabilities of the inputs A, B, and C equal to 0.4, 0.6, and 0.8 respectively as shown in FIG. 2. Let the threshold probability be 0.5. The dominant value of the input gate is assigned depending upon its type. In one embodiment, if the gate is identified as an OR or NOR gate, then the dominant value of the input gate is "1" and if the gate is identified as an AND or NAND gate, then the dominant value of the input gate is "0".

Assuming a fault due to an SEU on one of the inputs "A" at some instant of time, and assuming that all other signals are at logic "1" at that instant, the fault propagates through the gate because all other signals are at non-dominant values. In other words, a fault on the input "A" propagates to the output of the gate only when the other inputs assume non-dominant values. Interpreting this in terms of probabilities, an SEU on one of the inputs of a gate has a higher probability of upsetting its output only if the signal probability of all other inputs being at non-dominant value is greater than or equal to the threshold probability. As such, the gate is assumed to be sensitive to SEUs on its inputs.

Figure 4:
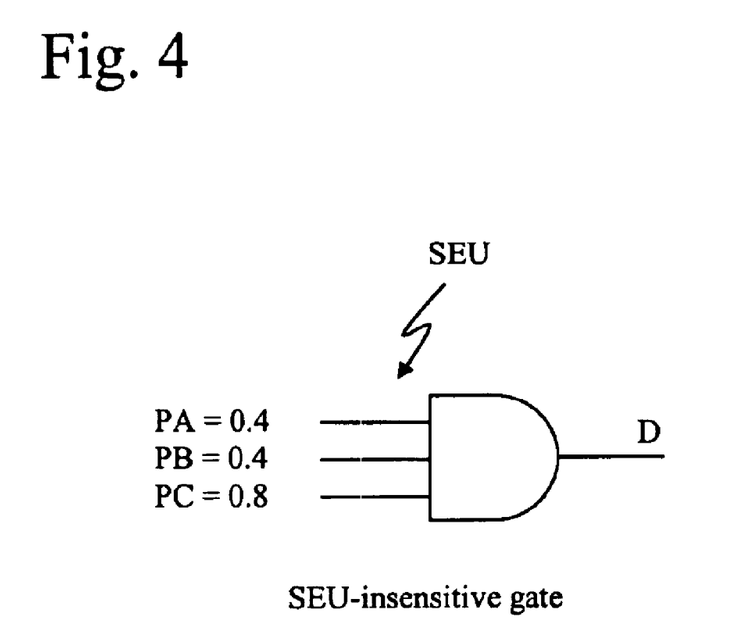
FIG. 4 is a diagrammatic view illustrating a single event upset (SEU) insensitive gate at a $P_{threshold}$ of 0.5 in accordance with the present invention.

With reference to FIG. 4, consider the 3-input gate with a different set of input probabilities. A (0.4), B (0.4) and C (0.8). The fault on line A has lesser probability of propagating through the gate as the probability of line B assuming non-dominant value is less than the threshold probability, consequently making the gate insensitive to SEUs on its inputs.

Figure 5:
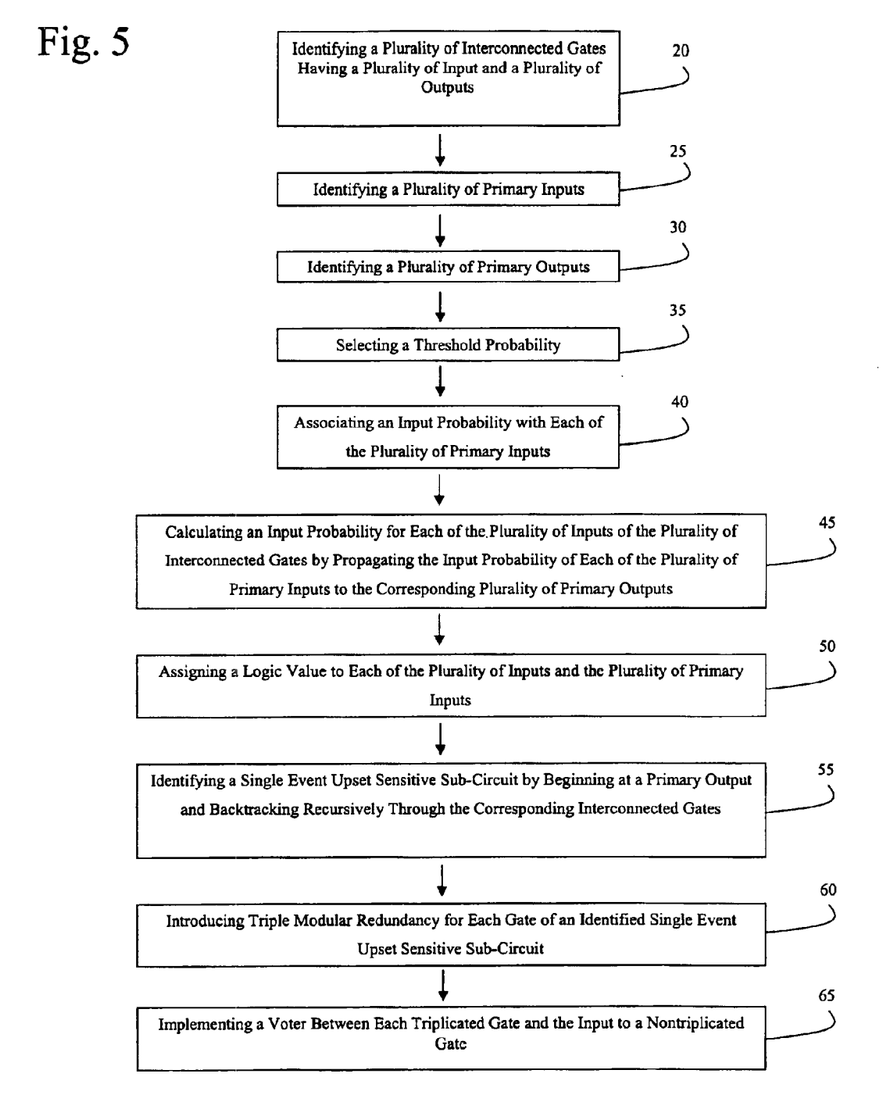
FIG. 5 is a diagrammatic flow diagram of the method in accordance with the present invention.

With reference to FIG. 5, a method for synthesizing a hardened circuit from a given circuit is provided for a FPGA having a plurality of interconnected gates, wherein the gates have a plurality of inputs and a plurality of outputs 20. Accordingly, the method includes identifying a plurality of primary inputs 25, identifying a plurality of primary outputs 30, selecting a threshold probability 35, associating an input probability with each of the plurality of primary inputs 40, calculating an input probability for each of the plurality of inputs of the plurality of interconnected gates by propagating the input probability of each of the plurality of primary inputs to the corresponding plurality of primary outputs 45, assigning a logic value to each of the plurality of inputs and the plurality of primary inputs 50, wherein a dominant logic value is assigned to the input if the input probability is greater than the threshold probability and a non-dominant logic value is assigned to the input if the input probability is less than the threshold probability, identifying a single event upset sensitive sub-circuit by beginning at a primary output and backtracking recursively through the corresponding interconnected gates 55. Upon identification of the single event upset sensitive sub-circuit, triple modular redundancy is then introduced for each gate of the identified single event upset sensitive sub-circuit 60. Additionally, a voter can be introduced between each triplicated gate and the input to a nontriplicated gate 65. The voter may be a look-up table or a tri-state buffer.

The non-dominant value for AND and NAND gate is "1", hence their sensitivity depends on the same criterion. The sensitivity of OR and NOR gates also depends on a common criterion. EXOR, EXNOR, and NOT gates propagate faults not matter what the signal probabilities of the inputs are, so these gates are always considered SEU sensitive. The output gates are also assumed to be sensitive as a heavy ion bombarding the gate might affect the final output.

Figure 6:
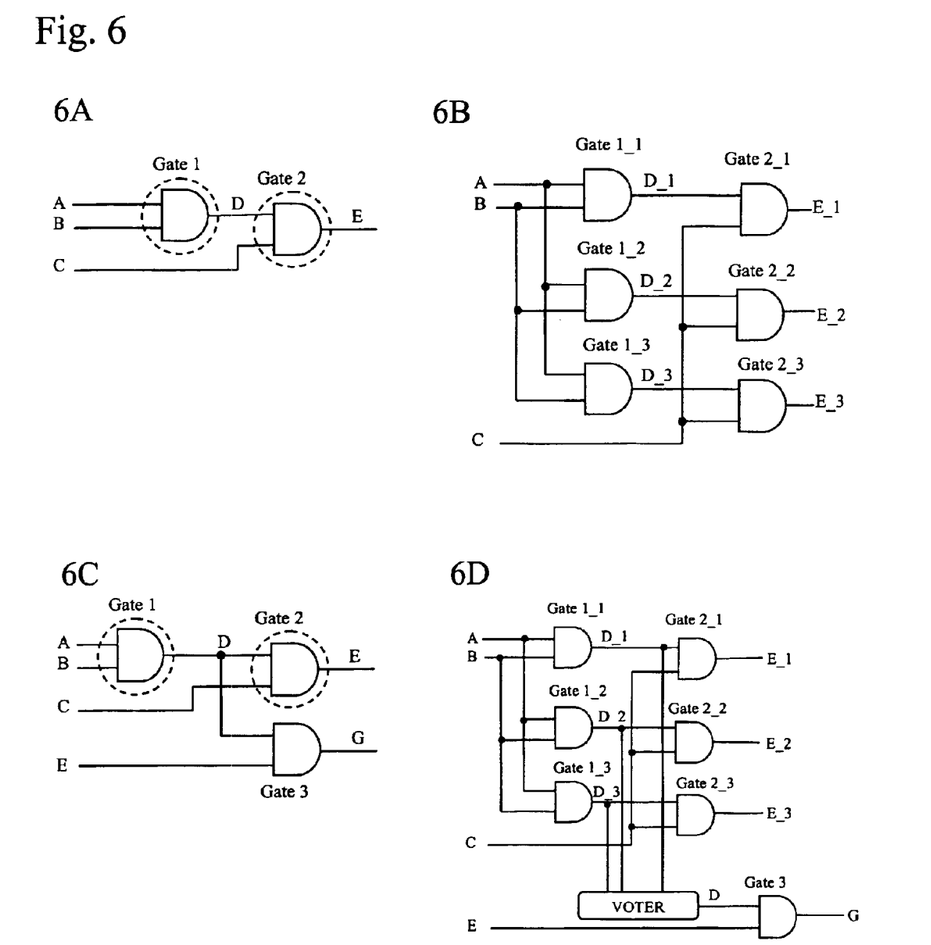
FIG. 6A illustrates the connection between two sensitive gates.
FIG. 6B illustrates the triplicated structure without fanout resulting from FIG. 6A in accordance with the present invention.
FIG. 6C illustrates an exemplary connection between two gates.
FIG. 6D illustrates the triplicated structure with fanout resulting from FIG. 6C in accordance with the present invention.

In accordance with the present invention, the circuit is immunized against upsets by mitigating SEUs in the sensitive sub-circuits. This is accomplished by applying TMR for all gates in such sub-circuits. Additionally, a voter is introduced between gates depending on the fanout connections of the sensitive gates. If the fanout of a sensitive gate is connected to only sensitive gates, then the outputs of the triplicates can be directly connected to the inputs of the triplicates of the next level. This implies that the introduction of a voter between such levels is not necessary. Referring to FIG. 6A in an exemplary embodiment, considering the two sensitive gates identified as Gate 1 and Gate 2 (marked by dotted circles) connected as shown. The output D of the SEU sensitive gate, Gate 1, is connected only to Gate 2, which is also sensitive. As such, the triplicated structure for this sub-circuit is as shown in FIG. 6B. If the fanout of the sensitive gate is connected to a non-triplicated gate, then a voter is introduced between them. The mitigated output is then fed to the non-triplicated gate. This situation is illustrated as in FIG. 6C, wherein the output of Gate 1, D, is connected to an SEU-sensitive gate, Gate 2, and a non-sensitive gate, Gate 3. Therefore, the outputs of the triplicated structure D_1, D_2 and D_3 have to be mitigated using a voter before it is fed to the gate of Gate 3, as shown in FIG. 6D.

Figure 7:
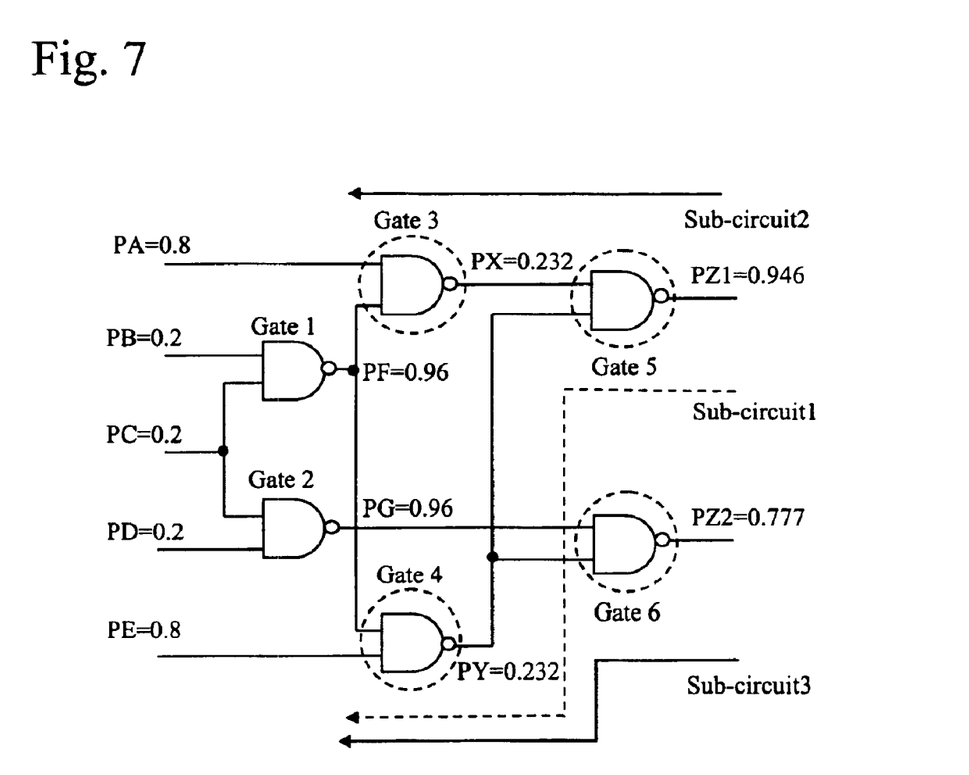
FIG. 7 is a diagrammatic view illustrating an exemplary circuit in which the SEU sensitive gates are determined and identified in accordance with the present invention.

In an exemplary embodiment in accordance with the present invention, consider the circuit as shown with reference to FIG. 7. The signal probabilities of the nets are calculated as shown in FIG. 7. Gate 4 is found to be SEU sensitive as a fault on line F or line E has a high probability of affecting its output Y. Similarly, Gate 3 is sensitive as an SEU on input A, or input F, having a high probability of affecting its output X. An SEU on line Y has a high probability of affecting the signal Z2 which is the output of Gate 6, hence it is considered sensitive. Gate 5, although it has no sensitive input is considered SEU sensitive as it is in the last level of the circuit. Therefore, it is determined that Gates 3, 4, 5 and 6 are SEU sensitive as shown by the dotted circles.

SEU sensitive sub-circuits are then obtained by starting at one of the outputs and backtracking through the continuous chain of sensitive gates. For example, the sub-circuit 1 can be obtained by starting at the primary output Z1. Backtracking from Gate 5, it is shown that Gate 3 and Gate 4 are sensitive gates connected to Gate 5. Backtracking recursively through Gate 3 and Gate 4, in two passes, it is shown that there are not sensitive gates when backtracking through Gate 4. Therefore, the process stops and Gate 4 and Gate 5 are marked as the sensitive gates in sub-circuit 1. Similarly, sub-circuit 2 and sub-circuit 3 as shown in the circuit of FIG. 7 can be identified.

TMR is now applied selectively on the subcircuits to harden the circuit against SEUs. The resulting STMR circuit is shown with reference to the circuit shown in FIG. 8., wherein all the gates in the sensitive sub-circuits are replaced with their triplicates. The hardened circuit has two voters introduced at the primary outputs. The voter can be implemented using either LUTs or tri-state buffers. However, it is preferred that tri-state buffers be used, as they are resistant to SEUs.

Figure 8:
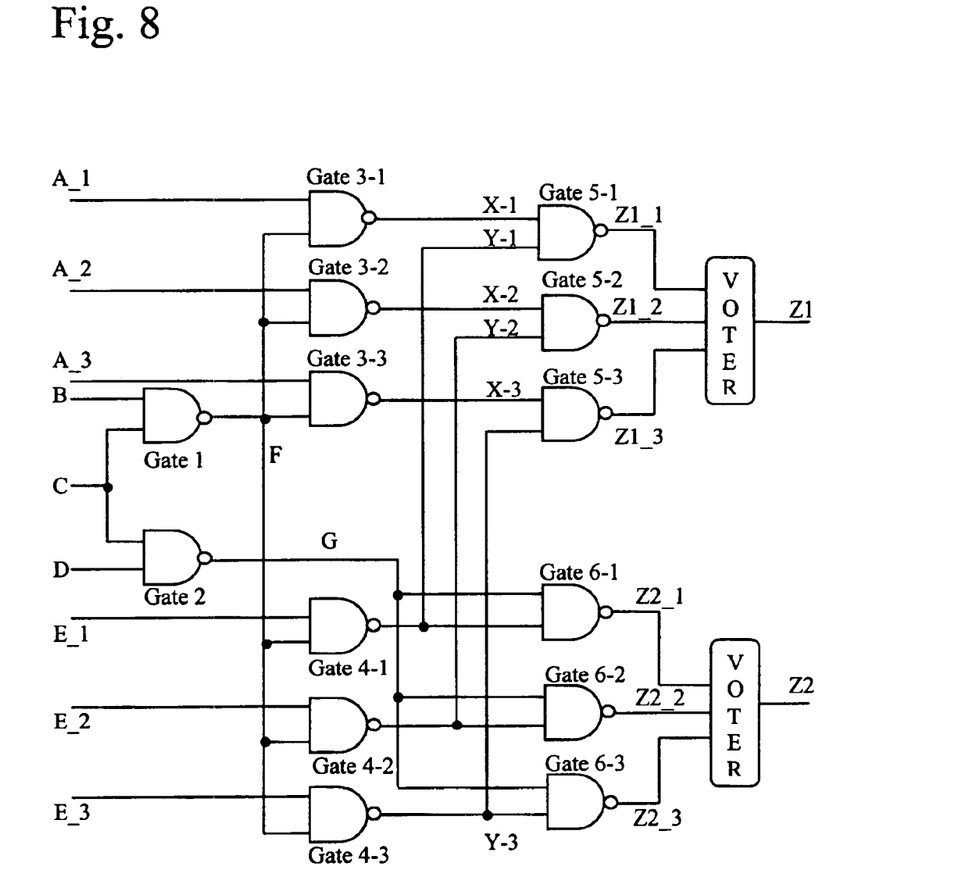
FIG. 8 is a diagrammatic view illustrating the exemplary circuit of FIG. 7 employing the STMR method in accordance with the present invention.

It s evident from the exemplary embodiment of FIG. 7 and FIG. 8 that the SEU hardened STMR circuit has a total of 14 gates. By contrast, the same circuit when hardened by full module TRM as known in the art would result in 18 gates. As such, a savings of 4 gates is provided by the method in accordance with the present invention for the given set of input signal probabilities.

The method and apparatus of the present invention provides an effective technique for SEU hardening in programmable logic devices. The effectiveness of the proposed method is dependent upon the input signal probabilities and the nature of the circuit. The STMR method is beneficial to those circuits with input environments wherein the size of the SEU sensitive sub circuits is much smaller than the original circuit. For such circuits, the area overhead of the STMR technique will be lesser than that of the TMR.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for creating selective circuit redundancy in programmable logic devices, the method comprising:
   selecting at least one gate of the plurality of gates of the programmable logic device, each of the gates having a plurality of inputs;
   associating an input probability with each of the plurality of inputs of the selected gate; selecting a threshold probability;
   comparing the input probability of the plurality of inputs to the threshold probability to identify at least one single event upset sensitive gate;
   identifying the single event upset sensitive sub-circuit associated with the single event upset sensitive gate;
   introducing circuit redundancy for each single event upset sensitive sub-circuit identified.

2. The method of claim 1, wherein the step of comparing the input probability of the plurality of inputs to the threshold probability to identify the at least one single event upset sensitive gate further comprises:
   assigning a logic value to each of the plurality of inputs, wherein a dominant logic value is assigned to the input if the input probability is greater than the threshold probability and a non-dominant logic value is assigned to the input if the input probability is less than the threshold probability; and
   determining the sensitivity of the gate.

3. The method of claim 2, wherein the step of determining the sensitivity of the gate further comprises, identifying the gate as a sensitive gate if only one of the plurality of inputs is assigned a dominant logic value.

4. The method of claim 2, wherein the step of determining the sensitivity of the gate further comprises, identifying the gate as a sensitive gate if all of the plurality of inputs are assigned non-dominant logic values.

5. The method of claim 2, wherein assigning a logic value to each of the plurality of inputs further comprises, assigning a logic value of zero to an input if the input probability is less than the threshold probability and assigning a logic value of one to an input if the input probability is greater than the threshold probability.

6. The method of claim 1, wherein the step of identifying at least one single event upset sensitive gate further comprises, identifying a gate as a sensitive gate wherein the gate is selected from the group consisting of EXOR, EXNOR and NOT gates.

7. The method of claim 1, wherein the step of introducing circuit redundancy for each single event upset sensitive gate further comprises, introducing triple modular redundancy for each single event upset sensitive gate.

8. The method of claim 1, wherein the probability threshold is selected to satisfy a required single event upset immunity.

9. The method of claim 1, wherein the probability threshold is selected to satisfy a required area constraint of the programmable logic device.

10. The method of claim 1, wherein the step of identifying the at least one primary input probability further comprises software profiling.

11. The method of claim 1, wherein the step of identifying the at least one single event upset sensitive sub-circuit further comprises:
   identifying a plurality of interconnected gates having a plurality of inputs and a plurality of outputs;
   identifying a plurality of primary inputs;
   identifying a plurality of primary outputs;
   associating an input probability with each of the plurality of primary inputs;
   calculating an input probability for each of the plurality of inputs of the plurality of interconnected gates by propagating the input probability of each of the plurality of primary inputs to the corresponding plurality of primary outputs;
   assigning a logic value to each of the plurality of inputs and the plurality of primary inputs, wherein a dominant logic value is assigned to the input if the input probability is greater than the threshold probability and a non-dominant logic value is assigned to the input if the input probability is less than the threshold probability; and
   identifying a single event upset sensitive sub-circuit by beginning at a primary output and backtracking recursively through the corresponding interconnected gates.

12. The method of claim 11, wherein the step of identifying a single event upset sensitive sub-circuit further comprises, identifying a gate in the sub-circuit as a sensitive gate if only one of the plurality of inputs to the gate is assigned a dominant logic value.

13. The method of claim 11, wherein the step identifying a single event upset sensitive sub-circuit further comprises, identifying a gate as a sensitive gate in the sub-circuit if all of the plurality of inputs to the gate are assigned non-dominant logic values.

14. The method of claim 11, wherein assigning a logic value to each of the plurality of inputs and to each of the plurality of primary inputs further comprises, assigning a logic value of zero to an input if the input probability is less than the threshold probability and assigning a logic value of one to an input if the input probability is greater than the threshold probability.

15. The method of claim 11, wherein the step of identifying a single event upset sensitive sub-circuit further comprises, identifying a gate as a sensitive gate wherein the gate is selected from the group consisting of EXOR, EXNOR and NOT gates.

16. The method of claim 11, wherein the step of identifying a single event upset sensitive sub-circuit further comprises, identifying a gate as a sensitive gate when the output of the gate is a primary output of the interconnected gates.

17. The method of claim 11, wherein the step of identifying a single event upset sensitive sub-circuit further comprises, identifying at least one sensitive gate in the sub-circuit.

18. The method of claim 11, further comprising introducing triple modular redundancy for each gate of an identified single event upset sensitive sub-circuit.

19. The method of claim 18, further comprising implementing a voter between each triplicated gate and the input to a nontriplicated gate.

20. The method of claim 19, wherein the voter is implemented with a tri-state buffer.

21. The method of claim 11, wherein the probability threshold is selected to satisfy a required single event upset immunity.

22. The method of claim 11, wherein the probability threshold is selected to satisfy a required area constraint of the programmable logic device.

23. The method of claim 11, wherein the step of identifying the plurality of primary input probabilities further comprises software profiling.

24. A programmable logic device (PLD) configured to implement a circuit having reduced sensitivity to single event upsets, the circuit comprising a plurality of sub-circuits, the PLD comprising, a redundant circuit for each single event upset sensitive gate comprising each single event upset sensitive sub-circuit, each single event upset sensitive gate identified by comparing the input probabilities of the gate against a threshold probability.

25. The PLD of claim 24, wherein the redundant circuit is a triple modular redundant circuit.

26. A method for reducing circuit sensitivity to single event upsets in programmable logic devices, the method comprising:

identifying a plurality of interconnected gates having a plurality of inputs and a plurality of outputs;

identifying a plurality of primary inputs;

identifying a plurality of primary outputs;

selecting a threshold probability;

associating an input probability with each of the plurality of primary inputs;

calculating an input probability for each of the plurality of inputs of the plurality of interconnected gates by propagating the input probability of each of the plurality of primary inputs to the corresponding plurality of primary outputs;

assigning a logic value to each of the plurality of inputs and the plurality of primary inputs, wherein a dominant logic value is assigned to the input if the input probability is greater than the threshold probability and a non-dominant logic value is assigned to the input if the input probability is less than the threshold probability;

identifying a single event upset sensitive sub-circuit by beginning at a primary output and backtracking recursively through the corresponding interconnected gates;

introducing triple modular redundancy for each gate of an identified single event upset sensitive sub-circuit; and implementing a voter between each triplicated gate and the input to a nontriplicated gate, wherein the voter is implemented with a tri-state buffer.

* * * * *